April 15, 1941.   L. S. GRANT   2,238,418
SAFETY HINGE
Filed Sept. 13, 1940   2 Sheets-Sheet 2
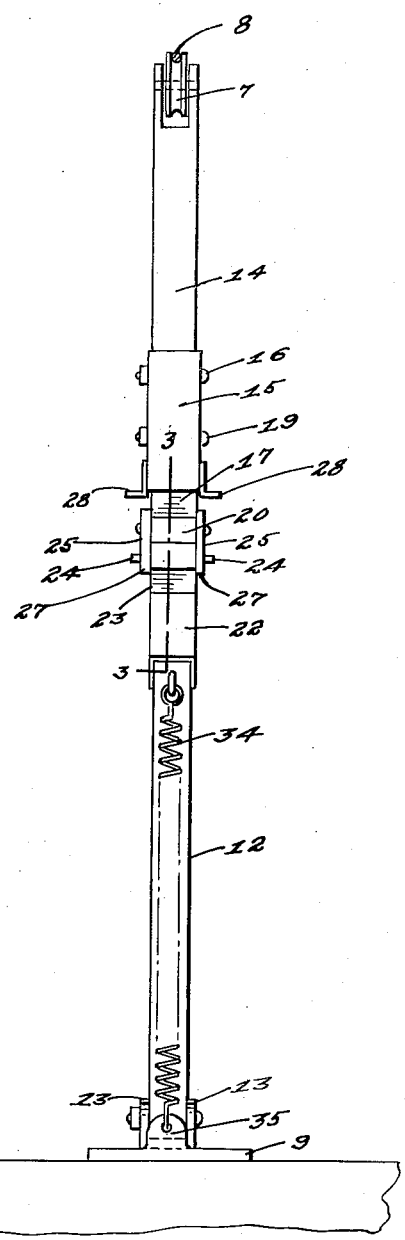
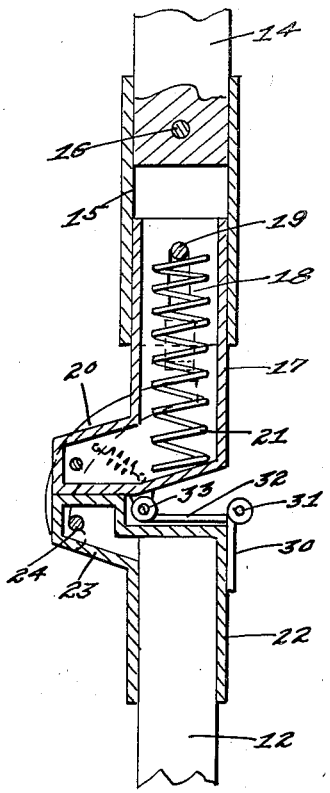
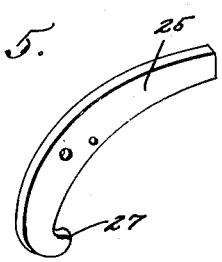
Inventor
Leigh S. Grant
By Clarence A. O'Brien
Attorney Patented Apr. 15, 1941

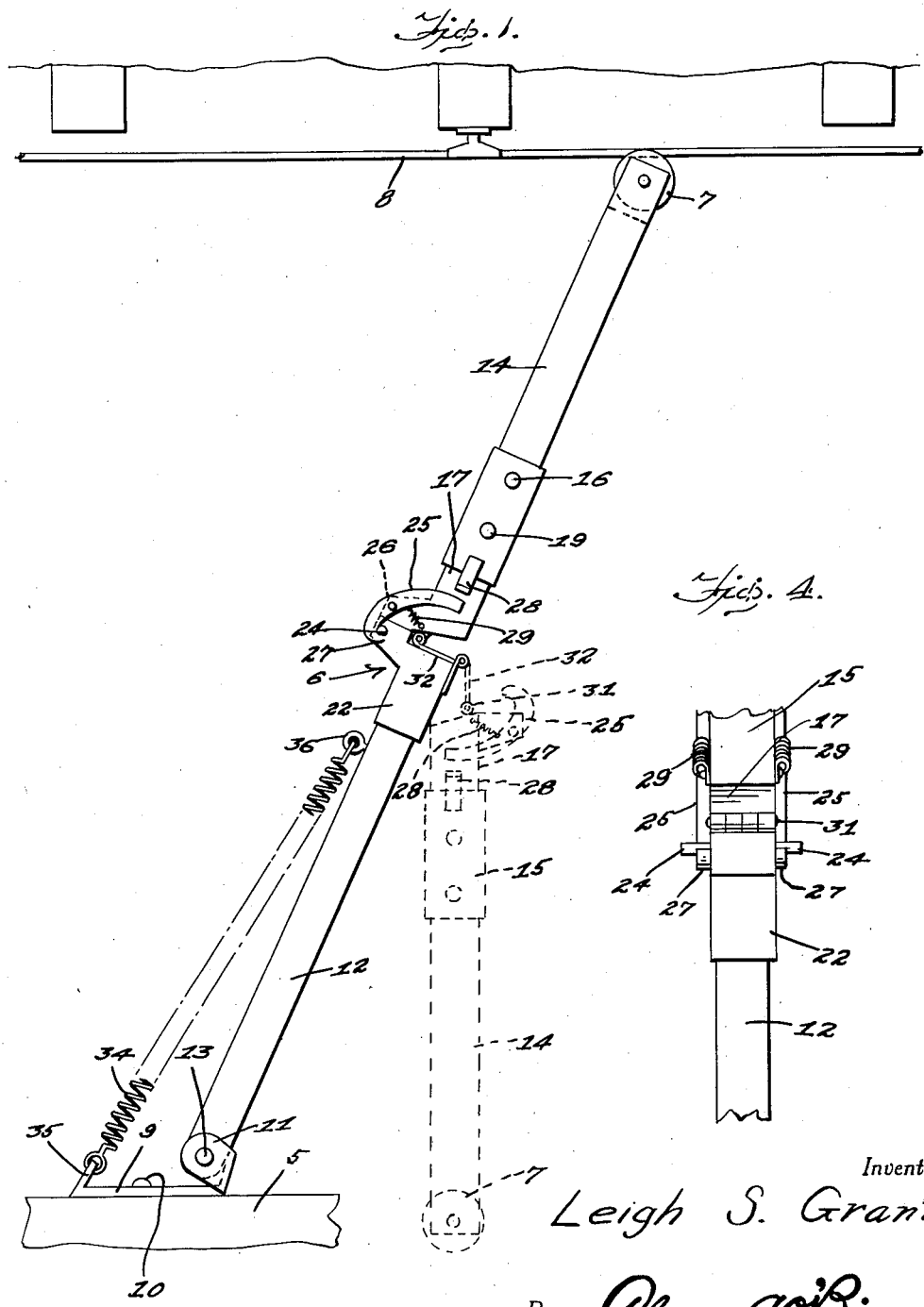

2,238,418

UNITED STATES PATENT OFFICE 2,238,418

SAFETY HINGE

Leigh S. Grant, Grass Valley, Calif.

Application September 13, 1940, Serial No. 356,695

2 Claims. (Cl. 191—64)

This invention appertains to new and useful improvements in hinged joints and more particularly to a hinged joint for sectional trolley poles.

The principal object of the present invention is to provide a joint for trolley poles such as are used on trolley cars which will automatically cause releasement of the upper section of the pole when it strikes an obstruction after leaving the trolley wire, and fall to a suspended position.

Another important object of the invention is to provide a joint which will automatically operate to release a trolley pole when it leaves the usual trolley wire and strikes some obstruction.

Other objects and advantages of the invention will become apparent to the reader of the following specification.

In the drawings:

Figure 1 represents a fragmentary side elevational view showing the trolley pole in contact with the trolley wire.

Figure 2 represents a front elevational view of the trolley pole.

Figure 3 is a sectional view taken substantially on a line 3—3 of Figure 2.

Figure 4 is a fragmentary rear side elevational view of the joint.

Figure 5 is a perspective view of one of the catches.

Referring to the drawings, wherein like numerals designate like parts, it can be seen in Figure 1, that numeral 5 represents the top of a trolley car to which the improved trolley pole generally referred to by numeral 6 is attached. The upper end of the trolley pole carries roller 7 for contact with the usual trolley wire 8.

Further, a base plate 9 is secured suitably as at 10 to the top of the trolley car 5 and this has ears 11 between which the lower end of the lower section 12 of the trolley pole 6 is pivotally secured as at 13.

The upper section 14 of the trolley pole is bifurcated at its upper end and has the trolley wire wheel 7 mounted therein. A guide sleeve 15 of square cross section is secured by pin, bolt, or the like 16 to the lower end of the section 14 and slidably disposed in this sleeve 15 is a shell 17 having longitudinal slots 18 in a pair of opposed sides thereof. A pin 19 is disposed through the sleeve 15 and through the slots 18, as is clearly shown in Figure 3.

The lower portion of the shell 17 is provided with a laterally disposed hollow foot 20 and interposed between the bottom of this foot 20 and the pin 19 is a coiled compression spring 21, which normally serves to maintain the shell 17 projected downwardly.

A cap 22 is provided for the upper end of the section 12 and this has a laterally disposed hollow shoulder 23 provided with studs 24 projecting from opposite sides thereof. Arcuate-shaped rockable catch members 25 are fulcrumed as at 26 on opposite sides of the foot 20 and have their heads 27 engageable with the studs 24, while their tail portions are located within the path of lugs 28 carried by the aforementioned sleeve 15. Tensioned springs 29 associated with the catches 25 serve to normally maintain the head 27 engaged with the studs 24.

A hinged connection is provided between the sections of the pole 6 and this consists of a plate 30 hingedly connected at one end as at 31 to one end of a plate 32, which is hingedly connected as at 33 to the bottom of the foot 20 adjacent the intermediate portion thereof and offset from the longitudinal axis of the pole when the sections thereof are alined.

An elongated tension spring 34 has one end connected to a lug 35 on the plate 9 while the other end connects to an eye 36 on the upper portion of the section 12. This spring 34 serves to maintain the pole in upright position and engaged with the trolley wire 8.

Should the pole become displaced with respect to the wire 8 and the spring 34 pull the pole upwardly so that the upper end, as for instance the roller 7, strikes some obstruction, the pole in attempting to underride the obstruction will result in the section 14 moving downwardly, the sleeve 15 over the shell 17. This will cause the lugs 28 to press against the tail portion of the catches 25, releasing the heads 27 from the studs 24, with the result that the upper section 14 will swing downwardly to the dotted line position shown in Figure 1.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A trolley pole comprising an upper section and a lower section, a hinged connection between the sections and catch means between the sections and means operated by the upper section for releasing the said catch means upon longitudinal movement of the upper section, said catch means and means for operating the catch means consisting of a catch member carried by the upper section, a projection on the lower section normally engaged by the catch, and a slide lug carried by the upper section for engaging the catch to release it from the said projection.

2. A trolley pole comprising an upper section and a lower section, a hinged connection between the sections, a catch means between the sections, means operated by the upper section for releasing the said catch means upon longitudinal movement of the upper section, said catch means and means for operating the catch means consisting of a catch member carried by the upper section, a projection on the lower section normally engaged by the catch, a slide lug carried by the upper section for moving the catch to release it from the said projection, said hinge connection including an upwardly extending tubular structure, the upper section being provided with a tubular section telescoping the tubular structure of the hinged connection, said tubular structure of the hinged connection being formed with a pair of diametrically opposed longitudinal slots, a cross pin in the tubular depending structure of the upper section extending through the slot, and a compression spring interposed between the lower end of the tubular structure of the hinged connection and the cross pin.

LEIGH S. GRANT.